(12) United States Patent
Furuse et al.

(10) Patent No.: US 11,773,988 B2
(45) Date of Patent: Oct. 3, 2023

(54) FLOW RESISTOR, FLOW RATE CONTROL DEVICE, AND FLOW RATE CONTROL METHOD

(71) Applicant: COSMO INSTRUMENTS CO., LTD., Tokyo (JP)

(72) Inventors: Akio Furuse, Tokyo (JP); Nobuyuki Suga, Tokyo (JP)

(73) Assignee: COSMO INSTRUMENTS CO., LTD., Tokyo (JP)

( * ) Notice: Subject to any disclaimer, the term of this patent is extended or adjusted under 35 U.S.C. 154(b) by 848 days.

(21) Appl. No.: 16/843,284

(22) Filed: Apr. 8, 2020

(65) Prior Publication Data

US 2021/0054943 A1 Feb. 25, 2021

(30) Foreign Application Priority Data

Aug. 21, 2019 (JP) .................................. 2019-151307

(51) Int. Cl.
| | | |
|---|---|---|
| F16K 7/06 | (2006.01) | |
| F16K 3/08 | (2006.01) | |
| F16K 3/34 | (2006.01) | |

(52) U.S. Cl.
CPC ............... F16K 7/061 (2013.01); F16K 7/06 (2013.01); F16K 3/08 (2013.01); F16K 3/34 (2013.01)

(58) Field of Classification Search
CPC ... F16K 3/34; F16K 3/08; F16K 7/061; F16K 7/04
See application file for complete search history.

(56) References Cited

U.S. PATENT DOCUMENTS

| | | | | |
|---|---|---|---|---|
| 3,976,277 A | * | 8/1976 | Basel | F16K 7/06 |
| | | | | 222/529 |
| 4,044,989 A | * | 8/1977 | Basel | F16K 7/06 |
| | | | | 251/7 |
| 5,013,006 A | * | 5/1991 | Furuse | G01M 3/007 |
| | | | | 251/8 |
| 2003/0071233 A1 | * | 4/2003 | Stewart | F16K 7/061 |
| | | | | 251/7 |

(Continued)

FOREIGN PATENT DOCUMENTS

| | | | | |
|---|---|---|---|---|
| DE | 102004037052 A1 | * | 3/2006 | ............... F16K 7/06 |
| JP | 3-105773 U | | 11/1991 | |
| JP | 2013-170653 A | | 9/2013 | |

*Primary Examiner* — Marina A Tietjen
(74) *Attorney, Agent, or Firm* — GREENBLUM & BERNSTEIN, P.L.C.

(57) ABSTRACT

A flow resistor includes a housing, a pipe, and an adjuster. The housing includes a through hole including a first hole portion and a second hole portion. The pipe includes a first extending portion and a second extending portion that extends in a direction different from an extending direction of the first extending portion. The adjuster includes a through hole. The pipe is inserted into the through hole of the housing, the first extending portion is positioned in the first hole portion, and the second extending portion is positioned in the second hole portion. The adjuster is positioned in the second hole portion and is a member movable toward the second extending portion. The through hole of the adjuster couples a space between the adjuster and the pipe with an outside of the flow resistor, in the second hole portion.

20 Claims, 9 Drawing Sheets

(56) References Cited

U.S. PATENT DOCUMENTS

2004/0004137 A1\* 1/2004 Furuse ................... G01F 1/36
239/569
2005/0072806 A1\* 4/2005 Spray .................. B67D 1/1405
251/6

\* cited by examiner

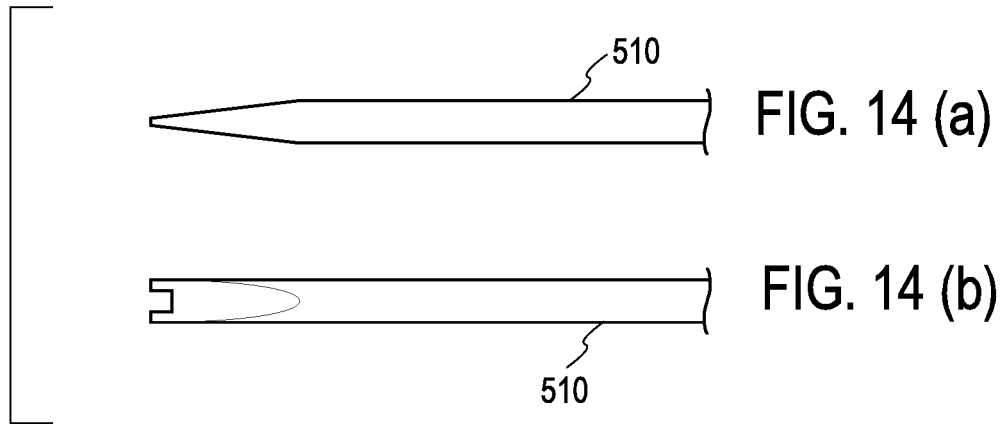
FIG. 14 (a)
FIG. 14 (b)
FIG. 15
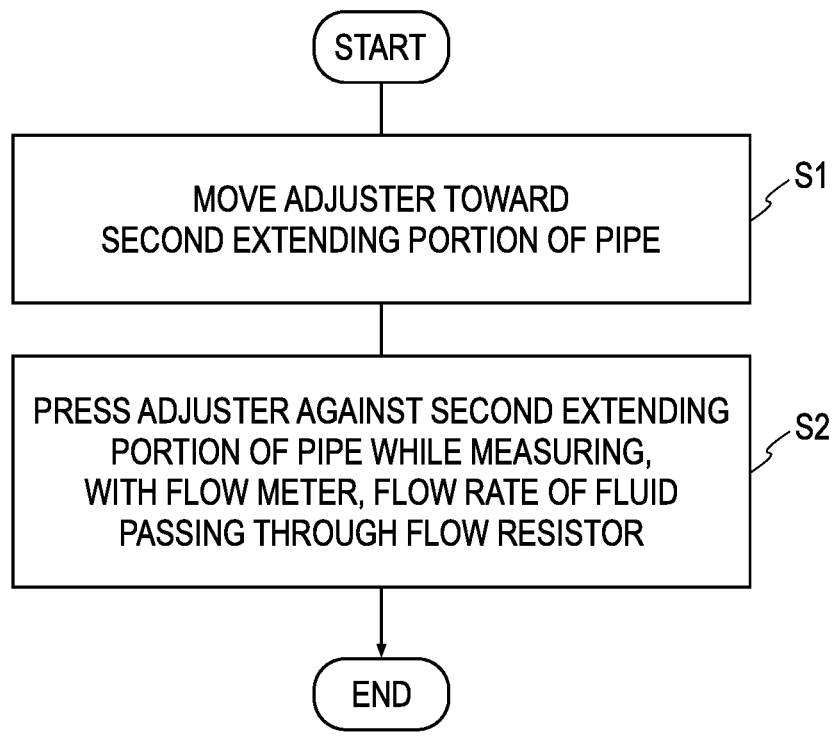

FLOW RESISTOR, FLOW RATE CONTROL DEVICE, AND FLOW RATE CONTROL METHOD

TECHNICAL FIELD

The present invention relates to a flow resistor.

BACKGROUND ART

A flow resistor has a narrowed channel. During fluid is supplied to a flow resistor at predetermined pressure, the flow resistor sets a flow rate of the fluid, which is to be discharged from the flow resistor, to a predetermined value. The flow rate is a volume per unit time, for example. Therefore, a flow resistor can be used as a reference device for calibrating a leakage flow rate. Those skilled in the art call a flow resistor "a flow resistance nozzle", "a leak master", or the like, as well.

A flow resistor disclosed in Japanese Utility Model Registration Application Laid Open No. H03-105773 includes a pipe 2, a packing gland 7, a first metal body 12, a second metal body 13, and a protection tube 16, for example, as illustrated in FIG. 1.

The first metal body 12 has an appearance like a circular truncated cone, in which a diameter of one end portion of the first metal body 12 is smaller than a diameter of the other end portion of the first metal body 12. A hole 12C having a cylindrical shape is formed on one end portion of the first metal body 12. The hole 12C has an opening on one end portion of the first metal body 12 and has a central axis line which is accorded with a central axis line of the first metal body 12. A female screw 12B is formed on the other end portion of the first metal body 12. The female screw 12B has a larger diameter than a diameter of the hole 12C and has a central axis line which is accorded with the central axis line of the first metal body 12. The hole 12C communicates with the female screw 12B via a dust-proof filter 17.

The second metal body 13 has a shape in which three portions each having a hollow cylindrical shape are discriminable and the three portions have diameters different from each other and share the same central axis line. One end portion with the corresponding hollow cylindrical shape of the second metal body 13 is a male screw 13A corresponding to the female screw 12B and the other end portion with the corresponding hollow cylindrical shape of the second metal body 13 is a male screw 13E. A central axis line of the male screw 13A is accorded with a central axis line of the second metal body 13 and a central axis line of the male screw 13E is accorded with the central axis line of the second metal body 13. A through hole 13B having a cylindrical shape and a central axis line accorded with the central axis line of the second metal body 13 is formed in the second metal body 13. The through hole 13B is matched with a space formed such that a hollow portion of the male screw 13E and a hollow portion of a central portion with the corresponding hollow cylindrical shape of the second metal body 13 are mutually joined. A female screw 13D is formed in the male screw 13A.

The female screw 13D is matched with a hollow portion of the male screw 13A. The diameter of the female screw 13D is larger than the diameter of the through hole 13B and is smaller than the diameter of the male screw 13A, and the female screw 13D has a central axis line accorded with the central axis line of the second metal body 13. The through hole 13B communicates with the female screw 13D. A female screw 13C is formed in the second metal body 13. The female screw 13C has one opening on an outer circumferential surface of the second metal body 13 and the other opening on the through hole 13B.

The packing gland 7 has a shape in which two portions each having a hollow cylindrical shape are discriminable and the two portions have diameters different from each other and share the same central axis line. One end portion with the corresponding hollow cylindrical shape of the packing gland 7 is a male screw corresponding to the female screw 13D. A through hole having a cylindrical shape is formed in the packing gland 7. The through hole of the packing gland 7 has one opening on one end portion of the packing gland 7 and has the other opening on the other end portion in hollow cylindrical shape of the packing gland 7.

The packing gland 7 is attached to the second metal body 13 with the female screw 13D of the second metal body 13 and the male screw of the packing gland 7 in a state that a packing 4 having a through hole is housed in the female screw 13D. In this state, the other end portion of the packing gland 7 presses the packing 4 against the second metal body 13. The central axis line of the second metal body 13 is accorded with a central axis line of the packing gland 7. The packing 4 is an O ring, for example.

The pipe 2 having a linear shape is inserted through the through hole 13B of the second metal body 13, the through hole of the packing 4, and the through hole of the packing gland 7. One end portion of the pipe 2 is protruded from the packing gland 7 and the other end portion of the pipe 2 is protruded from the second metal body 13.

The second metal body 13 to which the pipe 2 is attached is attached to the first metal body 12 with the male screw 13A of the second metal body 13 and the female screw 12B of the first metal body 12. In this state, one end portion of the pipe 2 is positioned in the inside of the female screw 12B. The central axis line of the second metal body 13 is accorded with the central axis line of the first metal body 12.

The protection tube 16 having a linear shape has a female screw corresponding to the male screw 13E of the second metal body 13, on one end portion thereof. The second metal body 13 to which the pipe 2 is attached is attached to the protection tube 16 with the male screw 13E of the second metal body 13 and the female screw of the protection tube 16. Since the whole length of the protection tube 16 is longer than the length of a portion, which protrudes from the second metal body 13, of the pipe 2, this protruding portion is covered by the protection tube 16.

A male screw 6 is inserted into the female screw 13C of the second metal body 13. The male screw 6 is screwed into the female screw 13C and thus, the end of the male screw 6 pushes and deforms the pipe 2. A required flow rate value is attained in accordance with the deformation level of the pipe 2.

This type of flow resistor is also disclosed in Japanese Patent Application Laid Open No. 2013-170653, for example.

In flow resistors of related art, external force is applied to the pipe 2 from a direction orthogonal to an extending direction of the pipe 2 so as to deform the pipe 2. A male screw is used as a tool for applying external force. Since the pipe 2 having the long whole length is used in consideration of a diameter of a male screw, it has been difficult to downsize a flow resistor.

BRIEF SUMMARY OF THE INVENTION

An object of the present invention is to provide a downsized flow resistor and a technique for controlling a flow rate of the flow resistor.

The technical matters to be mentioned in this section are described not to explicitly or implicitly limit the invention described in claims or state possibility for accepting such a limit made by a person other than those who are to be benefitted from the present invention (for example, the applicant and the entitled person), but to merely facilitate understanding of the gist of the present invention. A general outline of the present invention viewed from other angles can be understood from claims at the time of filing this patent application, for example.

A pipe of a flow resistor according to the present invention includes a first extending portion and a second extending portion. The extending direction of the first extending portion relates to a longitudinal direction of the flow resistor, that is, a flowing direction of fluid passing through the flow resistor, but the extending direction of the second extending portion is different from the extending direction of the first extending portion. That is, this pipe is a bent pipe. The second extending portion is pushed and deformed by an adjuster, realizing a required flow rate.

These and other objects, features and advantages of the present invention will become apparent from the detailed description taken in conjunction with the accompanying drawings.

Effects of the Invention

According to the present invention, a bent pipe is employed, being able to realize a compact flow resistor.

BRIEF DESCRIPTION OF THE DRAWINGS

The subject matter, which is regarded as the invention, is particularly pointed out and distinctly claimed in the claims at the conclusion of the specification. The present invention itself, and manner in which it may be made or used, if any, may be better understood after a review of the following description in connection with the accompanying drawings in which:

FIG. 2(a) is a left side view of the flow resistor of the embodiment, FIG. 2(b) is a sectional view of the flow resistor of the embodiment, and FIG. 2(c) is a right side view of the flow resistor of the embodiment;

FIG. 5(a) is a sectional view of the adjuster and FIG. 5(b) is a lateral view of the adjuster;

FIG. 6(a) is a lateral view of the packing gland and FIG. 6(b) is a sectional view of the packing gland;

FIGS. 14(a) and 14(b) are drawings illustrating a tool, especially, FIG. 14(a) is a lateral view of the tool and FIG. 14(b) is a front elevational view of the tool; and FIG. 15 is a processing flow for flow rate control according to the embodiment.

DETAILED DESCRIPTION

<Flow Resistor>

Figure 1:
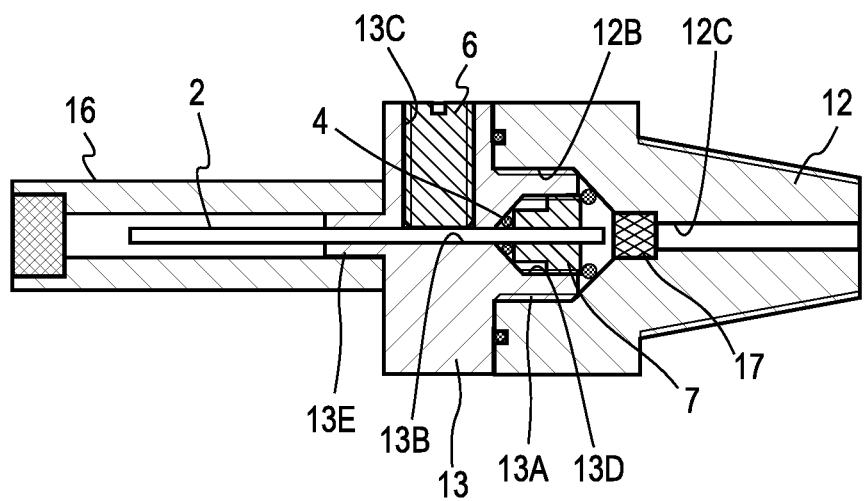
FIG. 1 is a sectional view illustrating a flow resistor of related art.
Figure 2:
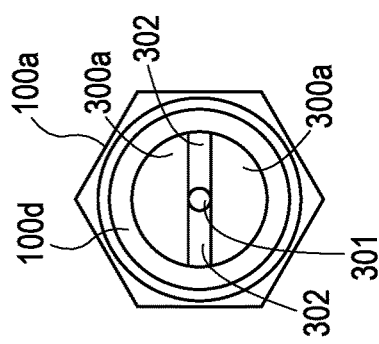
FIGS. 2(a)-2(c) are drawings illustrating a flow resistor according to an embodiment, especially.
Figure 2:
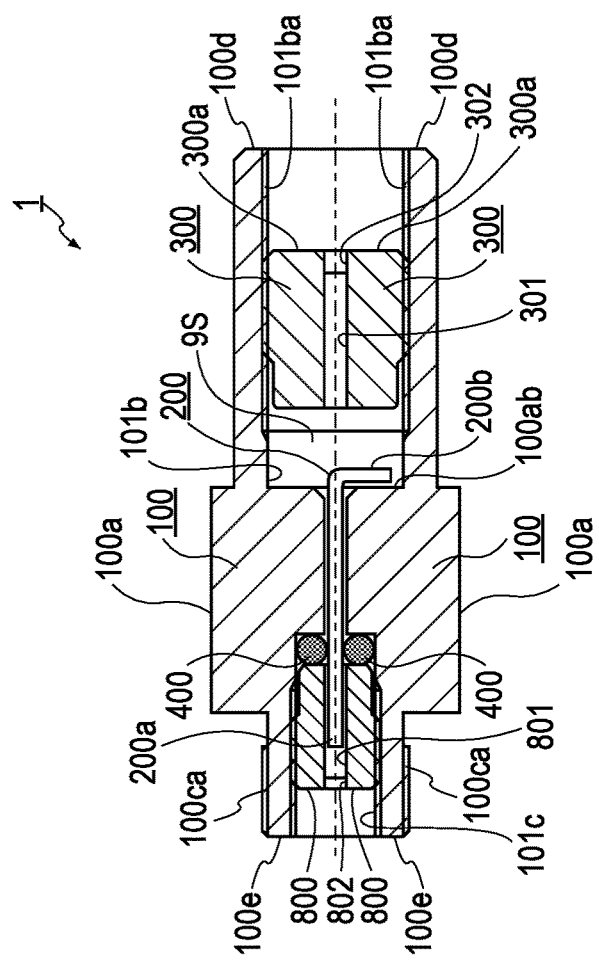
Figure 2:
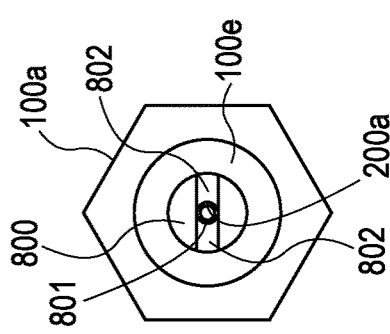
Figure 3:
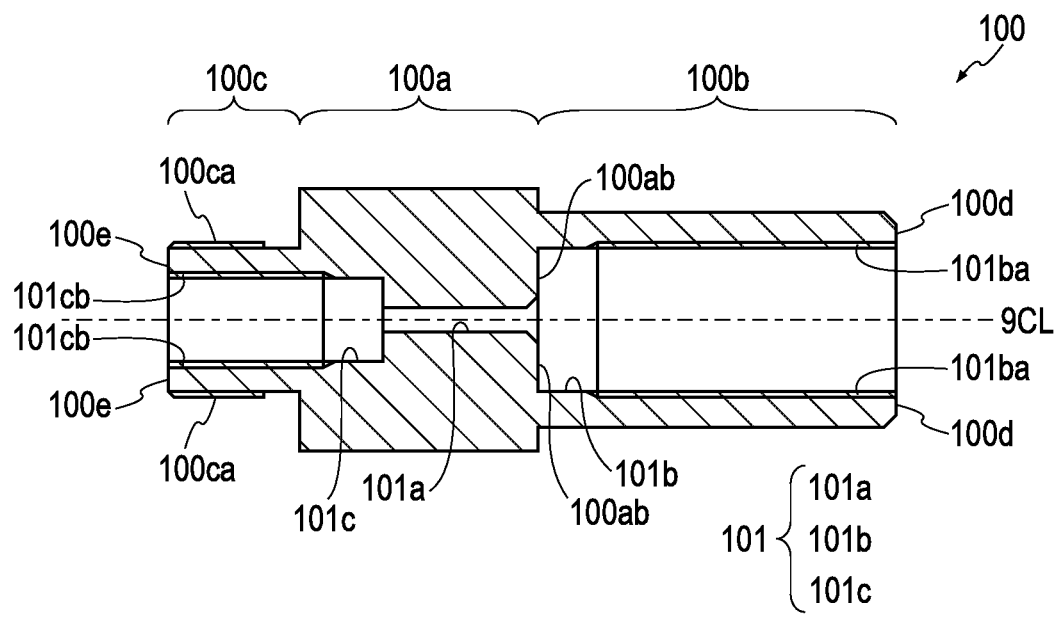
FIG. 3 is a sectional view illustrating a housing.
Figure 4:
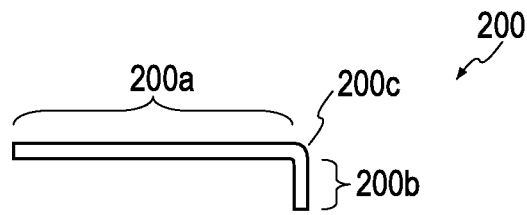
FIG. 4 is a front elevational view illustrating a pipe.
Figure 5:
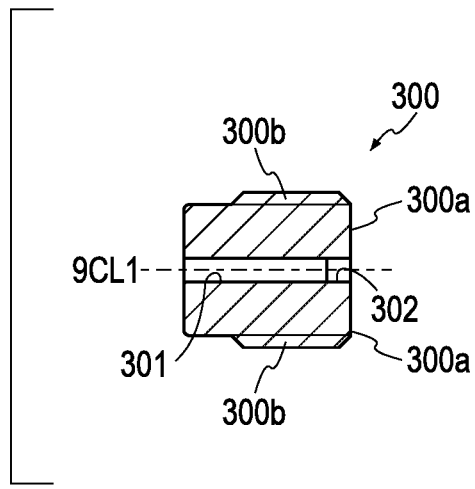
FIGS. 5(a) and 5(b) are drawings illustrating an adjuster, especially.
Figure 5:
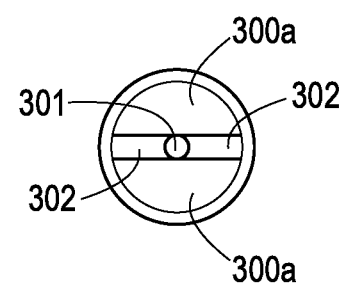
Figure 6:
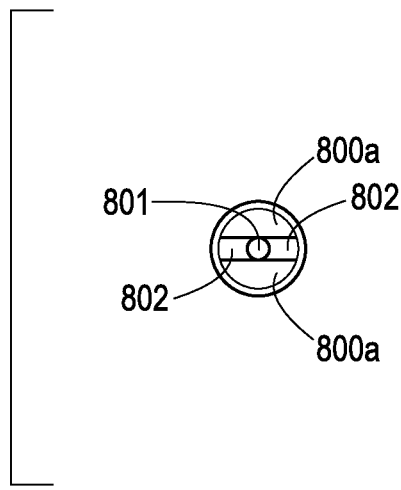
FIGS. 6(a) and 6(b) are drawings illustrating a packing gland, especially.
Figure 6:
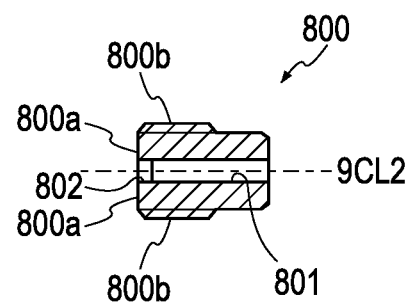
Figure 7:
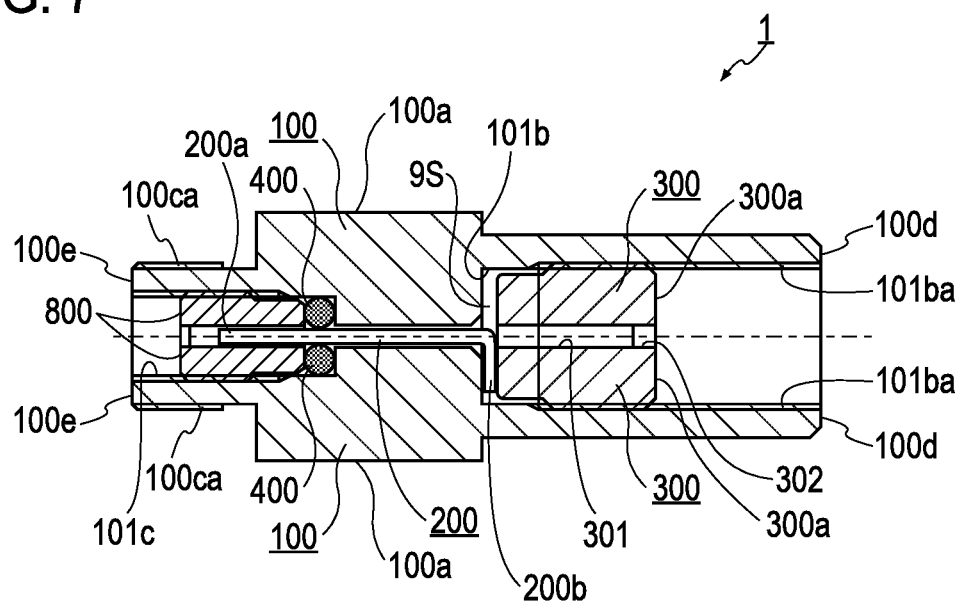
FIG. 7 is a sectional view illustrating the flow resistor in a state that the adjuster slightly pushes and deforms the pipe.

A flow resistor 1 according to an embodiment includes a housing 100, a pipe 200, an adjuster 300, and a packing gland 800 (see FIG. 2 to FIG. 7).

<Housing>

In the present embodiment, the housing 100 is a hollow rod-like body in which a through hole 101 is formed and three portions, specifically, a central portion 100a, one end portion 100b, and the other end portion 100c are discriminable.

The central portion 100a of the housing 100 has a hollow hexagonal prism shape having a central axis line accorded with a central axis line 9CL of the housing 100.

One end portion 100b of the housing 100 has a hollow cylindrical shape whose central axis line is accorded with the central axis line 9CL of the housing 100 and whose outer diameter is substantially the same as a width across flats of the central portion 100a. One end of one end portion 100b is one end surface 100d of the housing 100 and the other end of one end portion 100b is positioned on a boundary between the central portion 100a and one end portion 100b.

The other end portion 100c of the housing 100 has a hollow cylindrical shape whose central axis line is accorded with the central axis line 9CL of the housing 100 and whose outer diameter is smaller than the width across flats of the central portion 100a. One end of the other end portion 100c is positioned on a boundary between the central portion 100a and the other end portion 100c and the other end of the other end portion 100c is the other end surface 100e of the housing 100. A spiral groove, that is, a male screw portion 100ca is formed on an outer circumferential surface of the other end portion 100c.

The through hole 101 formed in the housing 100 has a cylindrical shape in which three hole portions, specifically, a first hole portion 101a, a second hole portion 101b, and a third hole portion 101c are discriminable.

The first hole portion 101a having a cylindrical shape has a central axis line which is accorded with the central axis line 9CL of the housing 100 and has a diameter which is slightly larger than an outer diameter of a first extending portion 200a of the pipe 200 which is described later. The second hole portion 101b having a cylindrical shape has a central axis line which is accorded with the central axis line 9CL of the housing 100 and has a diameter which is larger than the diameter of the first hole portion 101a. The third hole portion 101c having a cylindrical shape has a central axis line which is accorded with the central axis line 9CL of the housing 100 and has a diameter which is larger than the diameter of the first hole portion 101a.

One end of the first hole portion 101a is positioned on the boundary between the central portion 100a and one end portion 100b and the other end of the first hole portion 101a is positioned around the center of the central portion 100a.

The second hole portion 101b has the whole length which is substantially the same as the whole length of one end portion 100b of the housing 100. Here, the "whole length" is the length in the direction of the central axis line 9CL. One end of the second hole portion 101b is an opening positioned on one end surface 100d of the housing 100 and the other end of the second hole portion 101b is positioned on the boundary between the central portion 100a and one end portion 100b. A spiral groove, that is, a female screw portion 101ba is formed on an inner circumferential surface of one end portion 100b, that is, an inner wall surface of one end portion 100b surrounding the second hole portion 101b.

The third hole portion 101c has the whole length which is longer than the whole length of the other end portion 100c of the housing 100. One end of the third hole portion 101c is positioned around the center of the central portion 100a and the other end of the third hole portion 101c is an opening positioned on the other end surface 100e of the housing 100. A spiral groove, that is, a female screw portion 101cb is formed on an inner circumferential surface of the other end portion 100c, that is, an inner wall surface of the other end portion 100c surrounding the third hole portion 101c.

<Pipe>

In the present embodiment, the pipe 200 has a shape in which two extending portions, specifically, the first extending portion 200a which linearly extends and a second extending portion 200b which linearly extends in a direction different from the extending direction of the first extending portion 200a are discriminable. In the present embodiment, the extending direction of the first extending portion 200a is orthogonal to the extending direction of the second extending portion 200b.

<Adjuster>

The adjuster 300 has a hollow cylindrical shape. A through hole 301, which is formed in the adjuster 300 and has a cylindrical shape, has a central axis line accorded with a central axis line 9CL1 of the adjuster 300. A groove 302 having a linear shape is formed on one side end surface 300a of the adjuster 300. In the present embodiment, one opening of the through hole 301 is positioned on the bottom of the groove 302. A spiral groove corresponding to the female screw portion 101ba of the housing 100, that is, a male screw portion 300b is formed on an outer circumferential surface of the adjuster 300.

<Packing Gland>

The packing gland 800 has a hollow cylindrical shape. A through hole 801, which is formed in the packing gland 800 and has a cylindrical shape, has a central axis line accorded with a central axis line 9CL2 of the packing gland 800. A groove 802 having a linear shape is formed on one side end surface 800a of the packing gland 800. In the present embodiment, one opening of the through hole 801 is positioned on the bottom of the groove 802. A spiral groove which corresponds to the female screw portion 101cb of the housing 100, that is, a male screw portion 800b is formed on an outer circumferential surface of the packing gland 800.

<Assembly>

In the flow resistor 1, a packing 400 having the outer diameter which is slightly larger than the diameter of the third hole portion 101c of the housing 100 is squeezed to the back of the third hole portion 101c, that is, the vicinity of a boundary between the third hole portion 101c and the first hole portion 101a, by the packing gland 800 which is screwed into the third hole portion 101c. The packing gland 800 is screwed into the third hole portion 101c with a screw driver having an end portion which can enter the groove 802, for example. A through hole having a slightly smaller diameter than the outer diameter of the pipe 200 is formed in the packing 400. The packing 400 is an O ring, for example.

In the flow resistor 1, the pipe 200 is inserted into the through hole 101 of the housing 100. The first extending portion 200a of the pipe 200 is positioned in the first hole portion 101a of the housing 100 and the second extending portion 200b of the pipe 200 is positioned in the second hole portion 101b of the housing 100. More specifically, a bent portion 200c which is a boundary between the first extending portion 200a and the second extending portion 200b is positioned on the boundary between the central portion 100a and one end portion 100b. The second extending portion 200b is in contact with a wall surface 100ab or is positioned in the vicinity of the wall surface 100ab. The wall surface 100ab is positioned on a boundary between the first hole portion 101a and the second hole portion 101b and surrounds one end of the first hole portion 101a.

In the present embodiment, an end portion of the first extending portion 200a, on the farther side from the second extending portion 200b, passes through the through hole of the packing 400 to be positioned in the through hole 801 of the packing gland 800. The packing 400 is tightly attached to the outer circumferential surface of the pipe 200 and the inner circumferential surface of the central portion 100a, that is, the inner wall surface of the central portion 100a surrounding the third hole portion 101c. The packing 400 maintains airtightness or water-tightness between the first hole portion 101a and the third hole portion 101c. In other words, the third hole portion 101c communicates with the second hole portion 101b via the through hole 801 of the packing gland 800 and the pipe 200.

The adjuster 300 is positioned in the second hole portion 101b. In this state, the central axis line 9CL1 of the adjuster 300 and the central axis line 9CL of the housing 100 are accorded with each other. Since the adjuster 300 has the male screw portion 300b corresponding to the female screw portion 101ba of the housing 100, the adjuster 300 can be moved toward the second extending portion 200b by using an appropriate tool. In the present embodiment, such a tool is a screw driver having an end portion which can enter the groove 302.

The adjuster 300 is brought into contact with the second extending portion 200b by moving the adjuster 300 by a screw driver. The adjuster 300 is further moved, pushing and deforming the second extending portion 200b (see FIG. 7). As a result, the shape of the cross section of the first extending portion 200a differs from the shape of the cross section of the second extending portion 200b and further, a required flow rate value is attained depending on the deformation level of the second extending portion 200b. Here, the cross section of the first extending portion 200a is orthogonal to the extending direction of the first extending portion 200a and the cross section of the second extending portion 200b is orthogonal to the extending direction of the second extending portion 200b.

The through hole 301 of the adjuster 300 couples a space 9S between the adjuster 300 and the pipe 200 in the second hole portion 101b with the outside of the flow resistor 1. Accordingly, fluid flowing into the third hole portion 101c of the housing 100 can go out to the outside of the flow resistor 1 from the second hole portion 101b via the through hole 801 of the packing gland 800, the pipe 200, the space 9S, and the through hole 301 of the adjuster 300. Alternatively, fluid flowing into the second hole portion 101b can go out to the outside of the flow resistor 1 from the third hole portion 101c via the through hole 301 of the adjuster 300, the space 9S, the pipe 200, and the through hole 801 of the packing gland 800.

The flow resistor 1 includes the pipe 200 which is bent, and employs the configuration for pushing and deforming the second extending portion 200b by the adjuster 300, in which the second extending portion 200b does not greatly affect the size in the longitudinal direction of the flow resistor 1, that is, the flowing direction of fluid passing through the flow resistor 1. Accordingly, the whole length of the flow resistor 1 can be shortened compared to the whole length of flow resistors of related art which have employed the configuration for pushing and deforming a linear pipe in a direction orthogonal to the longitudinal direction of the flow resistors. Since the flow resistor 1 has the smaller size than flow resistors of related art, it is easy to directly attach the flow resistor 1 to an inspection object which has a female screw portion corresponding to the male screw portion 100ca or a male screw portion corresponding to the female screw portion 101ba.

Since the flow resistor 1 has the simpler configuration than flow resistors of related art, the flow resistor 1 can be manufactured inexpensively. In the present embodiment, the packing gland 800 is not an indispensable component of the flow resistor 1. When the packing gland 800 is not used, the packing 400 is not required either, being able to further reduce the number of components. In this case, the pipe 200 is attached to the first hole portion 101a of the housing 100 with adhesive, for example. However, when the packing gland 800 is used, the pipe 200 can be exchanged. That is, the pipe 200 is not completely fixed in the housing 100, so that the pipe 200 can be detached by detaching the adjuster 300 from the housing 100. For example, in the case where the pipe 200 is extremely pushed and deformed by mistake, degradation in yield of the flow resistor 1 can be avoided by exchanging the pipe 200 which was pushed and deformed with a new pipe.

The adjuster 300 is not moved after a predetermined flow rate is attained. That is, the adjuster 300 is left in the second hole portion 101b on the position on which the predetermined flow rate is attained. The second extending portion 200b of the pipe 200 is pushed and deformed by the adjuster 300, eliminating backlash of the screws. As a result, solid mechanical connection among the housing 100, the pipe 200, and the adjuster 300 is realized. Accordingly, a flow rate set at the time of assembly of the flow resistor 1 is still maintained when the flow resistor 1 is used.

The flow resistor 1 has the female screw portion 101ba, being able to be connected with a hose joint having a male screw portion corresponding to the female screw portion 101ba. The flow rate of the flow resistor 1 can be checked by connecting a hose joint to a flow meter, which is not illustrated, for example.

Since the flow resistor 1 includes the central portion 100a having the hexagonal prism shape, the flow resistor 1 can be fastened with a wrench.

<Modification>

Figure 8:
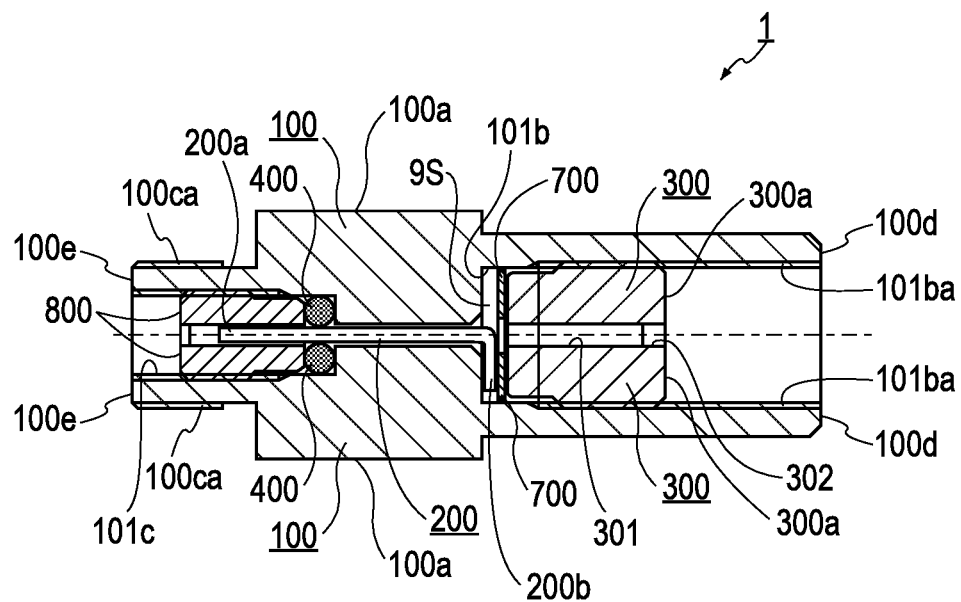
FIG. 8 is a sectional view of the flow resistor according to a modification.
Figure 9:
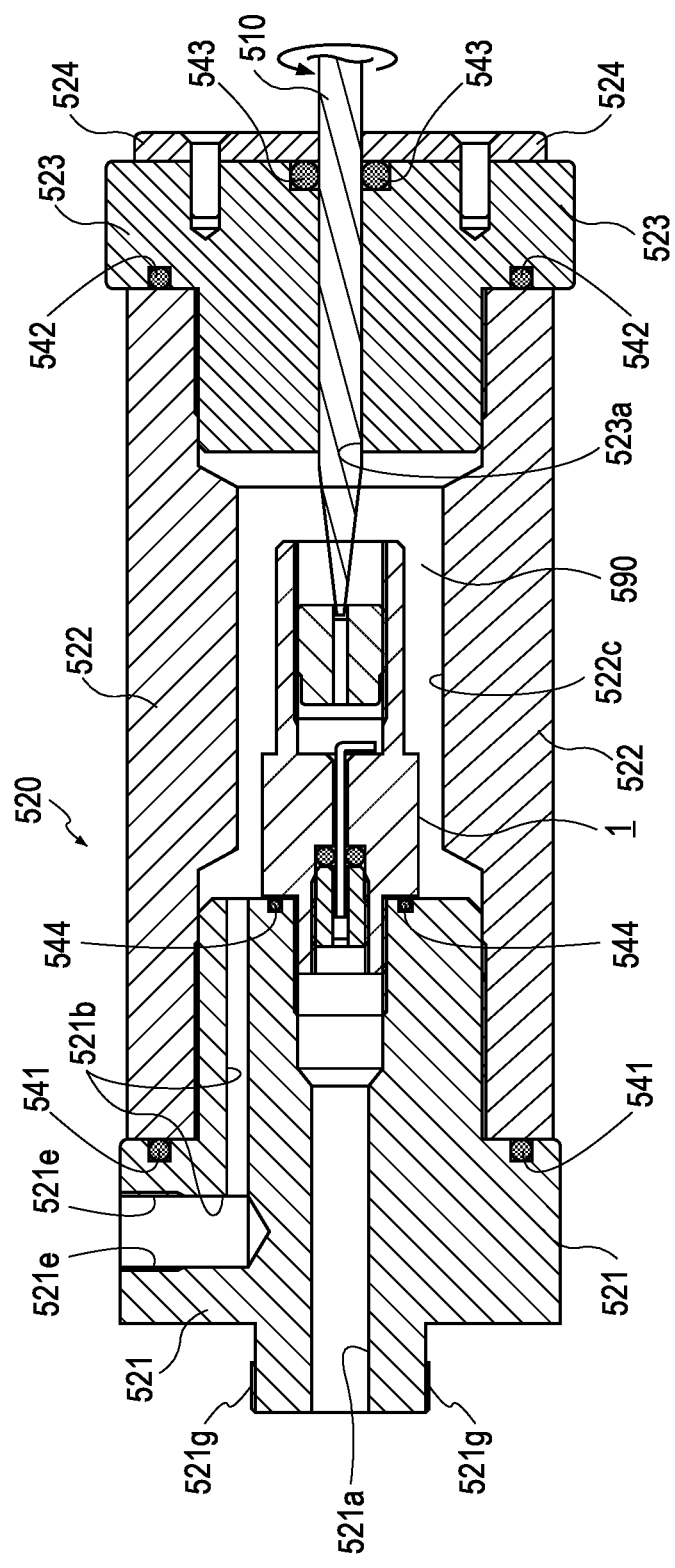
FIG. 9 is a sectional view illustrating a flow rate control device according to the embodiment.
Figure 10:
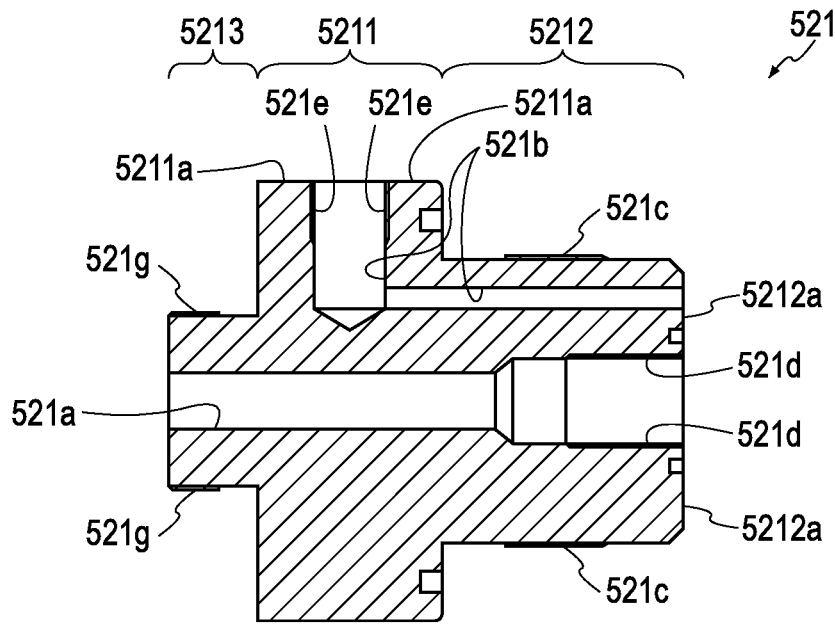
FIG. 10 is a sectional view illustrating a first part of a housing.
Figure 11:
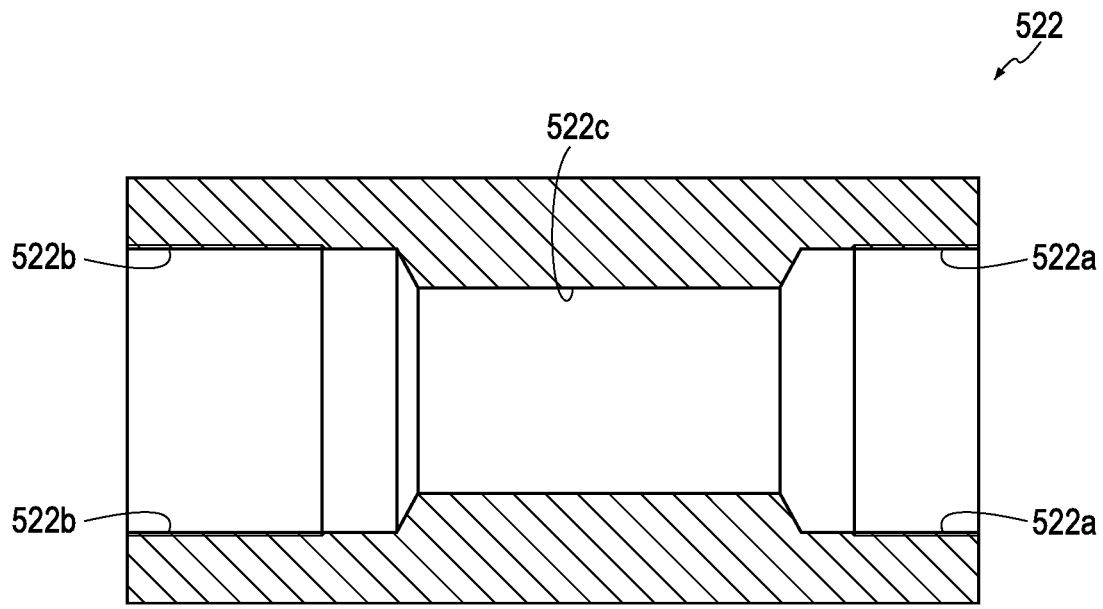
FIG. 11 is a sectional view illustrating a second part of the housing.
Figure 12:
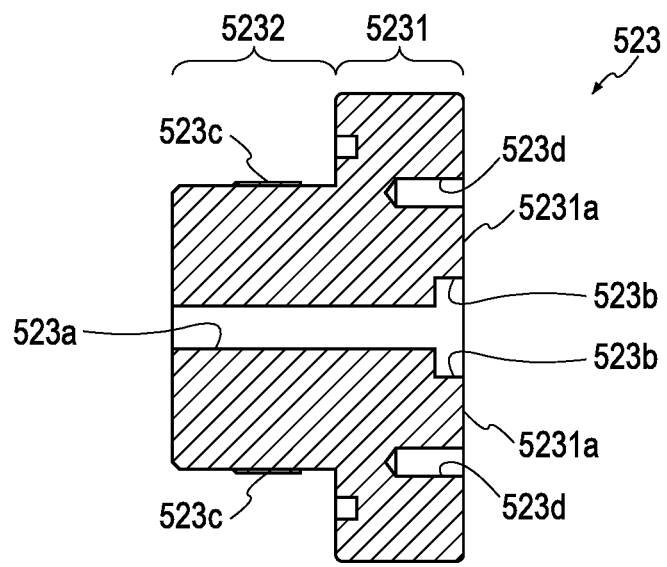
FIG. 12 is a sectional view illustrating a third part of the housing.
Figure 13:
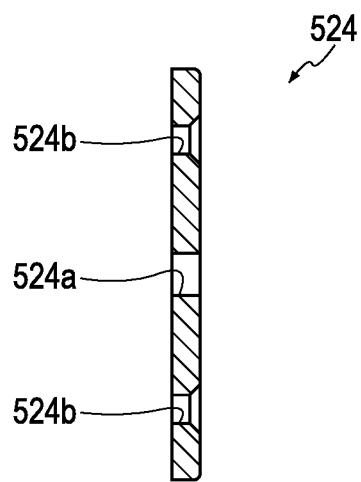
FIG. 13 is a sectional view illustrating a fourth part of the housing.

The following modification is also applicable instead of the above-described embodiment in which the adjuster 300 directly pushes and deforms the pipe 200. As illustrated in FIG. 8, the adjuster 300 may indirectly push and deform the pipe 200 in a state that a washer 700 is housed in the space 9S. The washer 700 is a flat washer, for example. The washer 700 functions as a buffer, so that it can be expected to prevent the adjuster 300 from damaging the pipe 200.

<Flow Rate Control Device/Method>

A flow rate control device and a flow rate control method for controlling a flow rate of the flow resistor 1 are now described. A flow rate control device 500 according to the embodiment includes a tool 510 and a housing 520 (see FIG. 9 to FIG. 14).

<Tool>

The tool 510 is a tool for moving the adjuster 300 toward the second extending portion 200b as described above, and is a screw driver having an end portion which can enter the groove 302 of the adjuster 300, for example.

<Housing>

In the housing 520, an inner space 590, a first through hole 523a, a second through hole 521a, and a third through hole 521b are formed. The inner space 590 houses the flow resistor 1. The first through hole 523a couples the inner space 590 with the outside of the flow rate control device 500 and the tool 510 is inserted into the first through hole 523a. The second through hole 521a couples the inner space 590 with the outside of the flow rate control device 500 and is a channel for fluid which is supplied to the flow resistor 1. The third through hole 521b couples the inner space 590 with the outside of the flow rate control device 500 and is a channel for fluid which comes out from the flow resistor 1. In the present embodiment, the housing 520 is composed of four parts 521, 522, 523, and 524.

<First Part>

The first part 521 in which the second through hole 521a having a cylindrical shape and the third through hole 521b having an L shape are formed is a hollow rod-like body in which three portions each having a hollow cylindrical shape are discriminable and the three portions have diameters different from each other and share the same central axis line. A spiral groove, that is, a male screw portion 521c is formed on an outer circumferential surface of one end portion 5212 with the hollow cylindrical shape of the first part 521. Further, a spiral groove, that is, a female screw portion 521d corresponding to the male screw portion 100ca of the flow resistor 1 is formed on an inner circumferential surface of one end portion 5212, that is, an inner wall surface of one end portion 5212 surrounding the second through hole 521a. One opening of the third through hole 521b is positioned on an end surface 5212a of one end portion 5212 of the first part 521. The other opening of the third through hole 521b is positioned on an outer circumferential surface 5211a of a central portion 5211 with the hollow cylindrical shape of the first part 521. A spiral groove, that is, a female screw portion 521e is formed on an inner wall surface of the central portion 5211 surrounding a vicinity of the other opening of the third through hole 521b. A spiral groove, that is, a male screw portion 521g is formed on an outer circumferential surface of the other end portion 5213 with the hollow cylindrical shape of the first part 521.

<Second Part>

A spiral groove, that is, a female screw portion 522a is formed on an inner circumferential surface of one end portion of the second part 522, in which a through hole 522c having a cylindrical shape is formed and which has the hollow cylindrical shape, that is, formed on an inner wall surface of one end portion surrounding the through hole 522c. A spiral groove corresponding to the male screw portion 521c of the first part 521, that is, a female screw portion 522b is formed on an inner circumferential surface of the other end portion of the second part 522, that is, on an inner wall surface of the other end portion surrounding the through hole 522c.

<Third Part>

The third part 523, in which the first through hole 523a having a cylindrical shape is formed, is a hollow rod-like body in which two portions each having a hollow cylindrical shape are discriminable and the two portions have diameters different from each other and share the same central axis line. In one end portion 5231 with the hollow cylindrical shape of the third part 523, two or more bolt holes 523d are formed. One opening of the first through hole 523a is positioned on an end surface 5231a of one end portion 5231 of the third part 523. On one end portion 5231 of the third part 523, an annular recessed portion 523b surrounding one opening of the first through hole 523a is formed. A spiral groove, that is, a male screw portion 523c is formed on an outer circumferential surface of the other end portion 5232 with the hollow cylindrical shape of the third part 523.

<Fourth Part>

The fourth part 524 is a disc shaped part in which a through hole 524a and bolt through holes 524b are formed.

<Assembly>

The flow resistor 1 is attached to the first part 521 by screwing the male screw portion 100ca of the flow resistor 1 into the female screw portion 521d of the first part 521. Airtightness or water-tightness between the first part 521 and the flow resistor 1 is maintained by a gasket 544 which is fitted in an annular recessed portion formed on one end portion 5212 of the first part 521. The gasket 544 is an O ring, for example. The first part 521 is attached to the second part 522 by screwing the male screw portion 521c of the first part 521, to which the flow resistor 1 is attached, into the female screw portion 522b of the second part 522. Airtightness or water-tightness between the first part 521 and the second part 522 is maintained by a gasket 541 which is fitted in an annular recessed portion formed on the central portion 5211 of the first part 521. The gasket 541 is an O ring, for example. The third part 523 is attached to the second part 522 by screwing the male screw portion 523c of the third part 523 into the female screw portion 522a of the second part 522. Airtightness or water-tightness between the second part 522 and the third part 523 is maintained by a gasket 542 which is fitted in an annular recessed portion formed on one end portion 5231 of the third part 523. The gasket 542 is an O ring, for example. The flow resistor 1 is positioned in the inner space 590 surrounded by the first part 521, the second part 522, and the third part 523. In the present embodiment, the fourth part 524 is bolted to be attached to one end portion 5231 of the third part 523.

Fluid flowing into the second through hole 521a of the housing 520 passes through the flow resistor 1, the inner space 590 of the housing 520, and the third through hole 521b of the housing 520 in this order and then goes out to the outside of the flow rate control device 500.

<Procedure>

A method for controlling a flow rate of the flow resistor 1 by using the flow rate control device 500, specifically, a method for setting a flow rate of the flow resistor 1 to a required flow rate is described below (see FIG. 15).

A hose joint which is not illustrated is connected to the female screw portion 521e of the housing 520. The hose joint is connected with a flow meter which is not illustrated. The other end portion 5213 of the first part 521 is connected to a constant pressure fluid supply source, which is not illustrated, via a hose joint which is not illustrated and has a female screw portion into which the male screw potion 521g can be screwed. The constant pressure fluid supply source is capable of supplying fluid at constant pressure. The constant pressure fluid supply source continuously supplies fluid to the flow resistor 1 via the second through hole 521a of the housing 520.

An end of the tool 510 is fitted in the groove 302 of the adjuster 300 in a state that the tool 510 is inserted into the through hole 524a of the fourth part 524 and the first through hole 523a of the third part 523. Airtightness or water-tightness between the housing 520 and the tool 510 is maintained by a packing 543 which is fitted in the annular recessed portion 523b. The adjuster 300 is moved toward the second extending portion 200b of the pipe 200 by rotating the tool 510 (step S1).

The adjuster 300 is pressed against the second extending portion 200b of the pipe 200 while measuring a flow rate of fluid passing through the flow resistor 1 with the flow meter (step S2). The second extending portion 200b is deformed and the flow rate consequently changes. At the time when a required flow rate value is measured, an operation of the tool 510 is stopped.

In the above-described embodiment, sizes of Japanese Industrial Standards (JIS) or International Organization for Standardization (ISO) may be employed as sizes of screws. For example, a female screw having 5 mm of diameter may be employed as the female screw portion 101ba of the flow resistor 1.

A well-known screw driver may be used as the tool 510, but a screw driver 510 illustrated in FIG. 14 may be used. The screw driver 510 has a bifurcate end portion. The end portion of the screw driver 510 does not block the opening of the through hole 301 positioned on the bottom of the groove 302, in a state the end portion of the screw driver 510 is entered in the groove 302. That is, the screw driver 510 can move the adjuster 300 without interrupting continuous flow rate measurement.

Addendum

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

Moreover, the use of the terms "first", "second", etc. do not denote any order or importance, but rather the terms "first", "second", etc. are used to distinguish one element from another. The terminology used herein is for the purpose of describing particular embodiments only and is not intended to limit the invention in any way. As used herein, the singular forms "a", "an" and "the" are intended to include the plural forms as well, unless the context clearly indicates otherwise. It will be further understood that the terms "comprise", "comprises", and/or "comprising," when used in this specification and/or the appended claims, specify the presence of stated features, steps, operations, elements, and/or components, but do not preclude the presence or addition of one or more other features, steps, operations, elements, components, and/or groups thereof. The term "and/or", if any, includes any and all combinations of one or more of the associated listed items. In the claims and the specification, unless otherwise noted, "connect", "join", "couple", "interlock", or synonyms therefor and all the word forms thereof do not necessarily deny the presence of one or more intermediate elements between two elements, for instance, two elements "connected" or "joined" to each other or "interlocked" with each other.

Unless otherwise defined, all terms (including technical and scientific terms) used herein have the same meaning as commonly understood by those skilled in the art to which the invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual techniques or steps in an unnecessary fashion. Nevertheless, the specification and claims should be read with the understanding that such combinations are entirely within the scope of the invention and the claims.

The corresponding structures, materials, acts, and equivalents of all means or step plus function elements in the claims below, if any, are intended to include any structure, material, or act for performing the function in combination with other claimed elements as specifically claimed.

The foregoing description of the embodiments of the invention has been presented for the purpose of illustration and description. It is not intended to be exhaustive and to limit the invention to the precise form disclosed. Modifications or variations are possible in light of the above teaching. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A flow resistor comprising:
   a housing having a through hole, the through hole including a first hole portion and a second hole portion having a diameter larger than a diameter of the first hole portion;
   a pipe including a first extending portion and a second extending portion, the second extending portion extending in a direction different from an extending direction of the first extending portion; and
   an adjuster having a through hole,
   the pipe being inserted into the through hole of the housing,
   the first extending portion being positioned in the first hole portion,
   the second extending portion being positioned in the second hole portion,
   the adjuster being positioned in the second hole portion and movable toward the second extending portion, and
   the through hole of the adjuster coupling a space between the adjuster and the pipe with an outside of the flow resistor, in the second hole portion.

2. The flow resistor according to claim 1, wherein
   the adjuster is in contact with the second extending portion, and
   a shape of a cross section of the first extending portion, the cross section of the first extending portion being orthogonal to the extending direction of the first extending portion, differs from a shape of a cross section of the second extending portion, the cross section of the second extending portion being orthogonal to an extending direction of the second extending portion.

3. The flow resistor according to claim 1, wherein
   the second hole portion includes a female screw portion, and
   the adjuster includes a male screw portion corresponding to the female screw portion.

4. The flow resistor according to claim 2, wherein
   the second hole portion includes a female screw portion, and
   the adjuster includes a male screw portion corresponding to the female screw portion.

5. The flow resistor according to claim 1, wherein
   the extending direction of the first extending portion is orthogonal to an extending direction of the second extending portion.

6. The flow resistor according to claim 2, wherein
   the extending direction of the first extending portion is orthogonal to the extending direction of the second extending portion.

7. The flow resistor according to claim 3, wherein
   the extending direction of the first extending portion is orthogonal to an extending direction of the second extending portion.

8. The flow resistor according to claim 4, wherein
   the extending direction of the first extending portion is orthogonal to the extending direction of the second extending portion.

9. The flow resistor according to claim 1, further comprising:
   a washer that is housed in the space.

10. The flow resistor according to claim 2, further comprising:
    a washer that is housed in the space.

11. The flow resistor according to claim 3, further comprising:
    a washer that is housed in the space.

12. The flow resistor according to claim 4, further comprising:
    a washer that is housed in the space.

13. The flow resistor according to claim 5, further comprising:
    a washer that is housed in the space.

14. The flow resistor according to claim 6, further comprising:
    a washer that is housed in the space.

15. The flow resistor according to claim 7, further comprising:
    a washer that is housed in the space.

16. The flow resistor according to claim 8, further comprising:
    a washer that is housed in the space.

17. A device configured to control a flow rate of a flow resistor, the flow resistor including: a housing having a through hole; a pipe including a first extending portion and a second extending portion; and an adjuster having a through hole, the through hole of the housing including a first hole portion and a second hole portion having a diameter larger than a diameter of the first hole portion, the second extending portion extending in a direction different from an extending direction of the first extending portion, the pipe being inserted into the through hole of the housing, the first extending portion being positioned in the first hole portion, the second extending portion being positioned in the second hole portion, the adjuster being positioned in the second hole portion and being a member movable toward the second extending portion, the through hole of the adjuster coupling a space between the adjuster and the pipe with an outside of the flow resistor, in the second hole portion, the device comprising:
  a tool to move the adjuster in the flow resistor toward the second extending portion of the pipe in the flow resistor; and
  a housing having an inner space, a first through hole, a second through hole, and a third through hole, the inner space housing the flow resistor, the first through hole coupling the inner space with an outside and allowing the tool to insert therein, the second through hole coupling the inner space with the outside and being a channel for fluid supplied to the flow resistor, the third through hole coupling the inner space with the outside and being a channel for the fluid coming out from the flow resistor.

18. The device according to claim 17, further comprising:
a packing that seals a gap between the housing and the tool.

19. A method for controlling a flow rate of a flow resistor, the flow resistor including: a housing having a through hole; a pipe including a first extending portion and a second extending portion; and an adjuster having a through hole, the through hole of the housing including a first hole portion and a second hole portion having a diameter larger than a diameter of the first hole portion, the second extending portion extending in a direction different from an extending direction of the first extending portion, the pipe being inserted into the through hole of the housing, the first extending portion being positioned in the first hole portion, the second extending portion being positioned in the second hole portion, the adjuster being positioned in the second hole portion and being a member movable toward the second extending portion, the through hole of the adjuster coupling a space between the adjuster and the pipe with an outside of the flow resistor, in the second hole portion, the method comprising
  pressing the adjuster against the second extending portion of the pipe in the flow resistor to deform the second extending portion.

20. The method according to claim 19, wherein
the pressing of the adjuster is performed while measuring, with a flow meter, a flow rate of fluid passing through the flow resistor disposed on a channel having no leakage.

* * * * *